H. F. SPELSHOUSE.
WHEEL TIRE.
APPLICATION FILED APR. 1, 1913.
1,096,467.
Patented May 12, 1914.
3 SHEETS—SHEET 2.
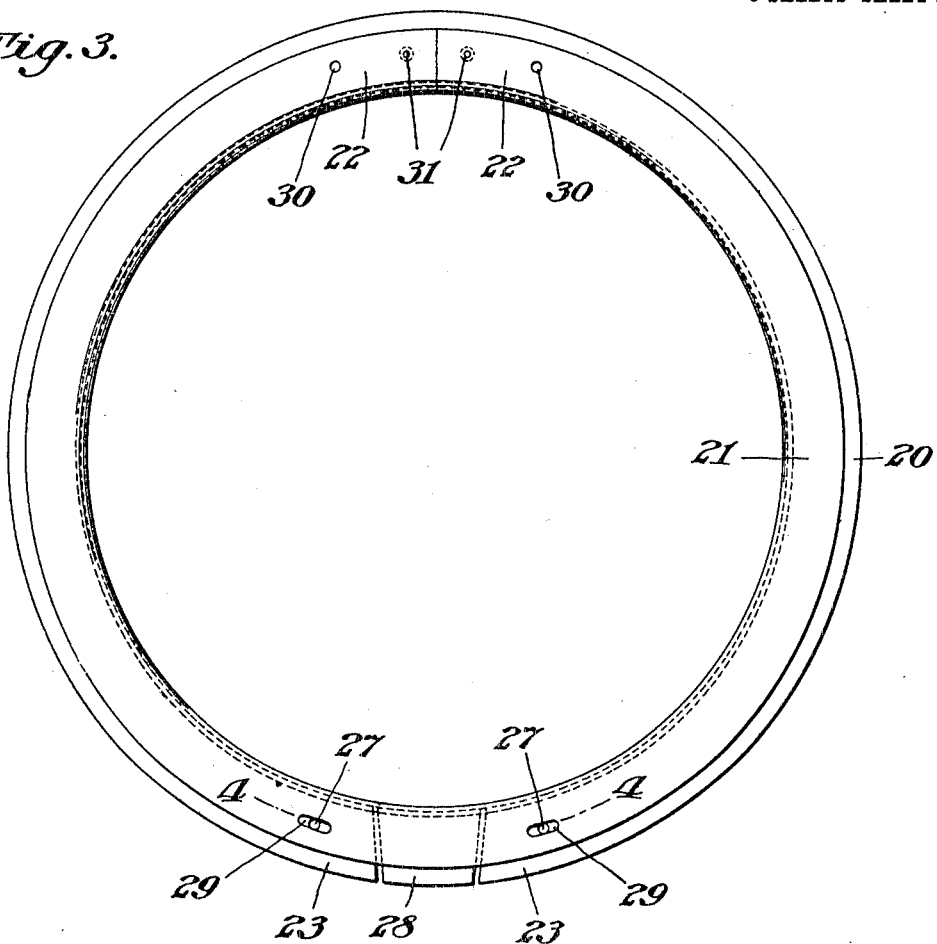
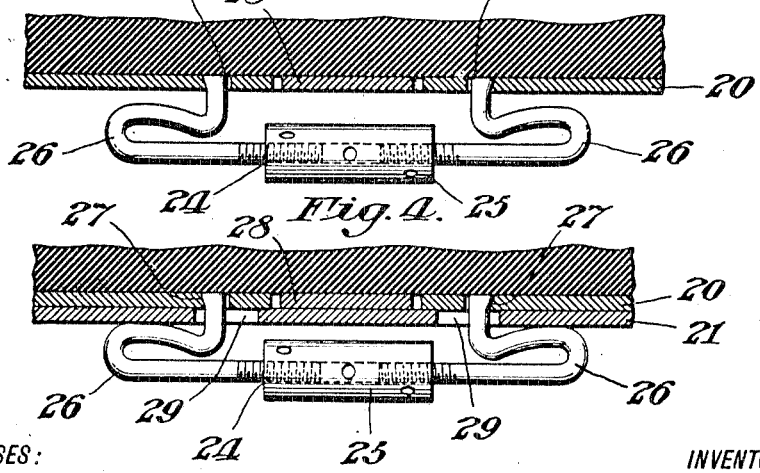
WITNESSES:
R. Schleicher
G. P. Sharkey
INVENTOR
Howard F. Spelshouse,
BY
A. V. Grout
ATTORNEY

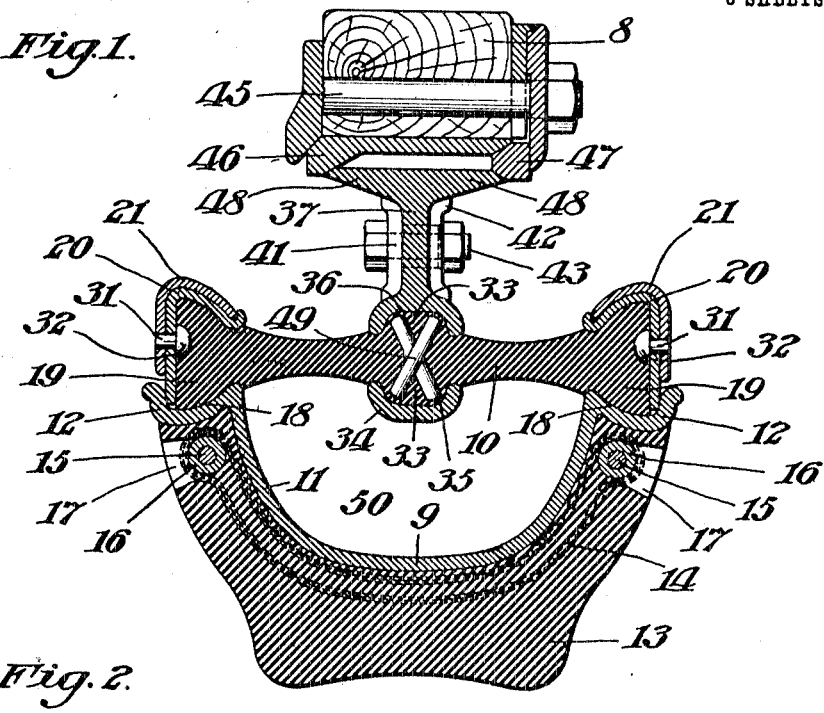

H. F. SPELSHOUSE.
WHEEL TIRE.
APPLICATION FILED APR. 1, 1913.

1,096,467.

Patented May 12, 1914.
3 SHEETS—SHEET 3.

WITNESSES:
R. Schleicher.
G. P. Sharkey.

INVENTOR
Howard F. Spelshouse,
BY
ATTORNEY

UNITED STATES PATENT OFFICE.

HOWARD F. SPELSHOUSE, OF PHILADELPHIA, PENNSYLVANIA, ASSIGNOR, BY MESNE ASSIGNMENTS, TO TENSION TIRE COMPANY, OF WILMINGTON, DELAWARE, A CORPORATION OF DELAWARE.

WHEEL-TIRE.

1,096,467.      Specification of Letters Patent.      Patented May 12, 1914.

Application filed April 1, 1918. Serial No. 758,090.

*To all whom it may concern:*

Be it known that I, HOWARD F. SPELSHOUSE, a citizen of the United States, residing at Philadelphia, in the county of Philadelphia and State of Pennsylvania, have invented certain new and useful Improvements in Wheel-Tires, of which the following is a specification.

This invention relates to wheel tires wherein a rigid annular rim is connected to a rigid annular felly by a stretchable elastic member in a manner to suspend the felly within the rim by the elastic member and to permit relative movement between the felly and the tire under the yielding action of the elastic member.

The object of my invention is to provide a simple, durable and efficient means to connect the elastic member to the felly and to the rim; and a further object of my invention is to associate the parts in a manner to increase the efficiency of the elastic member in yieldingly supporting the felly within the rim.

The invention consists in the novel construction and combinations of parts hereinafter fully described and claimed.

Figure 6:
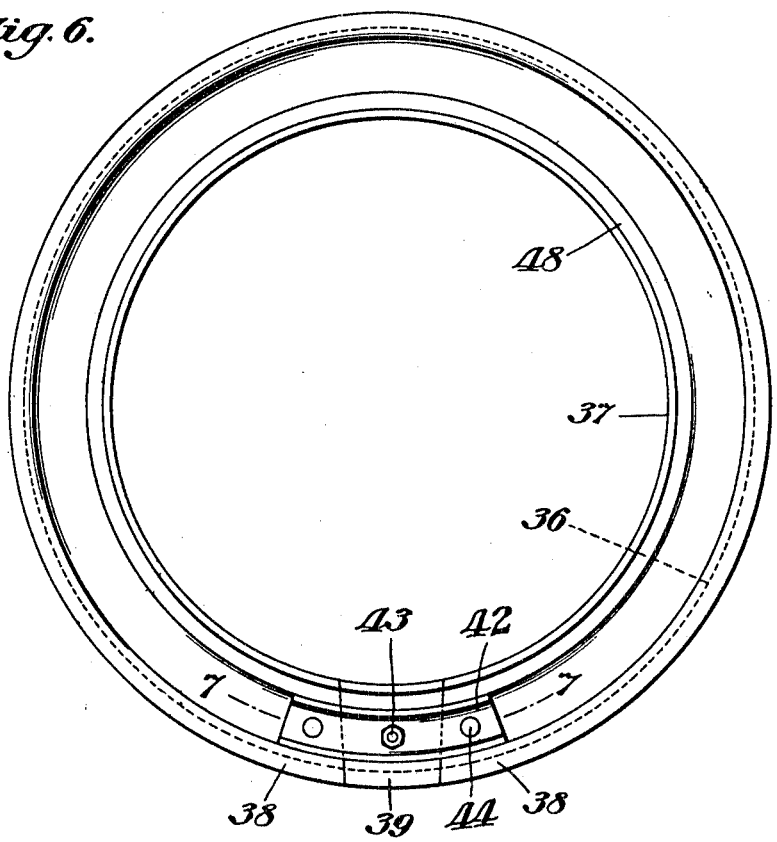
Figure 7:
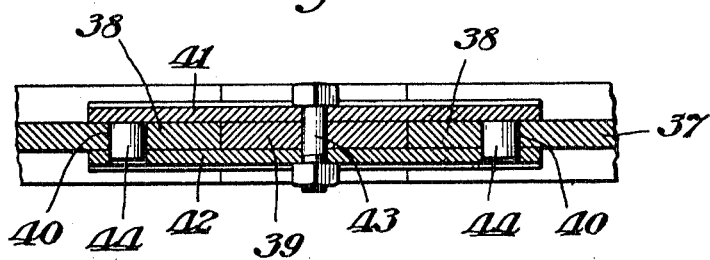

In the accompanying drawings, illustrating my invention: Figure 1, is a transverse section through a portion of a tire embodying my invention. Fig. 2, is a view of a portion of the tire, partly in section and partly in side elevation. Fig. 3, is a side elevation of the pair of clamping rings for clamping one edge of the elastic member. Fig. 4, is a section on line 4—4 of Fig. 3, including a part of the elastic member and showing the spreading device engaged with one of the clamping rings. Fig. 5, is a view similar to Fig. 4, omitting one of the clamping rings. Fig. 6, is a side elevation of one of the clamping rings for clamping the central portion of the elastic member. Fig. 7, is a section on line 7—7 of Fig. 6.

Referring to the drawings, 8 designates a rigid annular felly, 9 a rigid annular rim surrounding the felly in spaced relation thereto, and 10 an annular elastic member interposed between the felly 8 and the rim 9. The rim 9 is preferably formed of steel and comprises an annular body portion 11, U-shaped in cross section, and annular flanges 12 extending outwardly from the sides of the body portion. Surrounding the rim 9 and fitted to the outer faces of the body portion 11 and flanges 12 thereof is a shoe or tread portion 13 formed of rubber or other suitable material which may be cemented or otherwise secured to the rim. As an additional means to retain the shoe 13 on the rim 9, I embed layers of canvas 14 in the shoe and extend the canvas around expansible and contractible rings 15 which are also embedded in the shoe 13 adjacent the flanges 12. Each ring 15 is split providing adjacent ends which are oppositely screw threaded and are engaged by a turnbuckle 16. By turning the turnbuckles 16 the rings 15 may be contracted to draw them and the canvas 14 toward the flanges 12, thereby drawing the inner portion of the shoe 13 tight against the rim 9. The shoe 13 is provided with slots or openings 17 adjacent the turnbuckles 16 to afford access thereto.

Formed in the inner portions of the flanges 12 are inwardly-opening annular grooves 18 in which are seated annular ribs 19 formed on the edge portions of the elastic member 10. Each rib 19 is clamped within its groove 18 by a pair of clamping rings 20 and 21. The rings 20 and 21 of each pair are alike in every particular excepting that the pairs are made right and left, as shown, and therefore a description of one pair will suffice for both, as follows: The ring 20 embraces the rib 19 and its outer edge portion extends into the groove 18, and the ring 21 embraces and is seated on the ring 20, as shown. The ring 21 is split providing adjacent end portions 22, and the ring 20 is split providing end portions 23 between which a block 28 is inserted, the block 28 being the same shape, in cross section, as the ring 20. In clamping the rib 19 within the groove 18, the rib 19 is first placed within the groove and the ring 20 is then placed to extend around the inside of the rib 19 with its end portions 23 much closer together than as shown in the drawings. The end portions 23 are then forced apart to the position shown, thereby expanding the entire ring 20 and compressing the rubber forming the rib 19 and clamping the rib within the groove 18. To thus force the end portions of the ring 20 apart I provide a suitable tool 24, as shown in Fig. 4. This tool comprises a turn-buckle 25 and two hook-like members 26, having oppositely screw threaded shanks which are screwed into the ends of the turn buckle. By inserting the free ends of the members 26 into openings 27 in the end portions 23, as clearly shown in Fig. 4, and then turning the turnbuckle 25 the ring 20 may be readily expanded to clamp the rib 19. After the ring 20 has been expanded as just described the block 28 is inserted between the end portions 23 and the tool 24 is removed from the ring 20, leaving the end portions 23 engaged with the block 28 which holds the ring in the expanded condition. This being done, the ring 21 is placed to extend around the inside of the ring 20 with the end portions 22 of the ring 21 lapping each other. The members 26 of the tool 24 are then passed through slots 29 in the ring 21 and again inserted into the openings 27 in the ring 20, as shown in Fig. 5, and the turn buckle 25 is again operated to force the end portions 23 of the ring 20 apart and away from the ends of the block 28 and expand the ring 20. While the tool 24 holds the ring 20 thus expanded, a tool like the tool 24 is engaged with openings 30 in the lapping end portions 22 of the ring 21 and it is expanded until its end portions are brought into position to abut against each other, as shown in Fig. 3. The tool 24 is then removed from the openings 27, and the pressure of the compressed rib 19 contracts the ring 20 until the contraction thereof is stopped by the ring 21 before the end portions 23 of the ring 20 come into contact with the ends of the block 28, and thus the ring 21 holds the ring 20 sufficiently expanded to compress the rib 19 and firmly clamp it within the groove 18.

To prevent liability of the end portions 22 of the ring 21 being accidentally displaced toward the center of the ring, I provide pins 31 which extend through alined holes in the ring 20 and end portions 22 of the ring 21 and have heads 32 on the inner ends thereof which are pressed against the inner face of the ring 20 by the yielding rib 19. When the ring 21 is applied to the ring 20 the pins 31 are forced back against the yielding rib 19 until the openings in the ring 21 come into registry with the pins 31, then the pins 31 are forced out into the openings by the pressure of the rib 19.

The central portion of the elastic member 10 is made in the form of an annular rib 33 parallel to the ribs 19; and surrounding the member 10 and outer portion of the rib 33 is a ring 34 which has a groove 35 formed in its inner face in which the outer portion of the rib 33 is seated. The inner portion of the rib 33 is seated in a groove 36 in the outer portion of a ring 37 which surrounds the felly 8. The ring 37 is split providing end portions 38 between which a block 39 is inserted, the block 39 being the same shape, in cross section, as the ring 37. The rib 33 is clamped between the rings 34 and 37. Normally the end portions 38 of the ring 37 are closer together than as shown in the drawings; and in this contracted condition of the ring 37 it may readily be applied to the inner portion of the rib 33. After being applied to the rib 33, the ring 37 is expanded by a tool similar to the tool 24 which is inserted into openings 40 in the end portions 38 of the ring 37 and the end portions 38 are thereby spread apart a distance slightly greater than that shown, whereupon the block 39 is inserted and the end portions 38 are released and allowed to abut against the ends of the block 39 which holds the ring 37 in expanded condition. The expanding of the ring 37 compresses the rib 33 between the rings 34 and 37 and firmly clamps the rib 33 thereto. To prevent accidental displacement of the block 39 I provide a pair of plates 41 and 42 longer than the block 39 and engaged with the respective side faces of the block 39 and ring 37, and I secure them together by means of a bolt 43 extending transversely therethrough, the plate 41 having projections 44 which enter the openings 40 and openings in the plate 42.

The ring 37 is secured to the felly 8 by means of transverse bolts 45 extending through the felly and provided with parts which engage wedge members 46 and 47 interposed between the ring 37 and the felly 8 and having beveled portions which engage the beveled sides of the inner face of side flanges 48 on the inner portion of the ring 37. Any suitable means may be employed to secure the ring 37 to the felly 8.

The smallest diameter of the rim 9 is greater than the largest diameter of the ring 34 and when the parts are assembled, as shown in the drawings, the elastic or rubber member 10 extends through the spaces between its securing means on lines parallel to the axis of rotation of the felly 8, and it follows, therefore, that all parts of the member 10 between its securing means will be stretched during either up or down movements of the felly 8 with relation to the rim 9.

To prevent the rib 33 from being accidentally displaced from between the rings 34 and 37, I provide the rib 33 with spaced pins or members 49 formed of metal or other non-elastic material and embedded in the rib. These pins 49 cross each other in alternate succession and each pin 49 extends into the grooves 35 and 36 and is set at an angle extending from one side of one groove to the opposite side of the other groove, as shown.

In assembling the parts of the tire, the central portion of the member 10 is secured to the ring 37 before the rings 20 and 21 are applied to secure the edge portions of the member 10 to the rim 9, and I proceed as follows: I first spring the ring 34 into the annular channel 50 in the rim 9, I then place the member 10 within the ring 34, and then place the ring 37 within the member 10 and expand the ring 37 and clamp the rib 33 between the rings 34 and 37. This being done, I apply the rings 20 and 21 to clamp the ribs 19 or edge portions of the member 10 to the rim 9, as previously explained, and I then secure the ring 37 to the felly 8, as described.

I claim:

1. The combination of a rigid annular felly, a rigid annular rim surrounding the felly and movable relatively thereto, a ring surrounding the felly between it and the rim, an expansible and contractible ring surrounding the felly between it and the first named ring, an annular elastic member having a part located between said rings, the second named ring being expanded and clamping said member between said rings, means for holding the second named ring in expanded condition, means for securing the second named ring to the felly, and means for securing a part of said elastic member to said rim.

2. The combination of a rigid annular felly, a rigid annular rim surrounding the felly and movable relatively thereto, a ring surrounding the felly between it and the rim, a ring surrounding the felly between it and the first named ring and having a split therein providing adjacent end portions movable from and toward each other to expand and contract the ring, an annular elastic member having a part located between said rings, the second named ring being expanded and clamping said member between said rings, a block located between the end portions of the second named ring, means for holding said block in place, means for securing the second named ring to the felly, and means for securing a part of said elastic member to said rim.

3. The combination of a rigid annular felly, a rigid annular rim surrounding the felly and movable relatively thereto, a ring surrounding the felly between it and the rim, a ring surrounding the felly between it and the first named ring and having a split therein providing adjacent end portions movable from and toward each other to expand and contract the ring, an annular elastic member having a part located between said rings, the second named ring being expanded and clamping said member between said rings, plates engaging the side faces of said ring and said block and holding said block in place, means for holding said plates in place, means for securing the second named ring to the felly, and means for securing a part of said elastic member to said rim.

4. The combination of a rigid annular felly, a rigid annular rim surrounding the felly and movable relatively thereto, a ring surrounding the felly between it and the rim and having an annular groove formed therein, an expansible and contractible ring surrounding the felly between it and the first named ring, an elastic member having an annular rib formed thereon and seated in said groove, the second named ring being expanded and clamping said rib between said rings, means for holding the second named ring in expanded condition, means for securing the second named ring to the felly, and means for securing a part of said elastic member to said rim.

5. The combination of a rigid annular felly, a rigid annular rim surrounding the felly and movable relatively thereto, a ring surrounding the felly between it and the rim and having an annular groove formed therein, an expansible and contractible ring surrounding the felly between it and the first named ring and having an annular groove formed therein, an elastic member having an annular rib formed thereon and seated in said grooves, the second named ring being expanded and clamping said rib between said rings, means for holding the second named ring in expanded condition, means for securing the second named ring to the felly, and means for securing a part of said elastic member to said rim.

6. The combination of a rigid annular felly, a rigid annular rim surrounding the felly and movable relatively thereto, a ring surrounding the felly between it and the rim and having an annular groove formed therein, a ring surrounding the felly between it and the first named ring and having an annular groove formed therein facing the groove in the first named ring, an elastic member having an annular rib formed thereon and seated in said grooves, a non-elastic part embedded in said member and extending into said grooves, means for securing the second named ring to the felly, and means for securing a part of said elastic member to said rim.

7. The combination of a rigid annular felly, a rigid annular rim surrounding the felly and movable relatively thereto, a ring surrounding the felly between it and the rim and having an annular groove formed therein, a ring surrounding the felly between it and the first named ring and having an annular groove formed therein facing the groove in the first named ring, an elastic member having an annular rib formed thereon and seated in said grooves, and a non-elastic part embedded in said member and extending into said grooves and set at an angle extending from one side of one groove to the opposite side of the other groove, means for securing the second named ring to the felly, and means for securing a part of said elastic member to said rim.

8. The combination of a rigid annular felly, a rigid annular rim surrounding the felly and movable relatively thereto and having an annular groove formed in one side thereof, an annular elastic member having an annular rib formed on one side thereof and seated in said groove, means for securing the other side of said member to said rim, means for securing said member to said felly, an expansible and contractible ring clamping said rib within said groove, and an expansible and contractible ring seated on the first named ring and holding it in place.

9. The combination of a rigid annular felly, a rigid annular rim surrounding the felly and movable relatively thereto and having an annular groove formed in one side thereof, an annular elastic member having an annular rib formed on one side thereof and seated in said groove, means for securing the other side of said member to said rim, means for securing said member to said felly, an expansible and contractible ring clamping said rib within said groove, and a ring seated on the first named ring and holding it in place, the second named ring having a split therein providing adjacent end portions movable from and toward each other to expand and contract the ring, said end portions abutting each other and holding the second named ring in expanded condition.

10. The combination of a rigid annular felly, a rigid annular rim surrounding the felly and movable relatively thereto and having an annular groove formed in one side thereof, an annular elastic member having an annular rib formed on one side thereof and seated in said groove, means for securing the other side of said member to said rim, means for securing said member to said felly, an expansible and contractible ring clamping said rib within said groove, a ring seated on the first named ring and holding it in place, the second named ring having a split therein providing adjacent end portions movable from and toward each other to expand and contract the ring, said end portions abutting each other and holding the second named ring in expanded condition, and pins extending through said rings and preventing displacement of said end portions.

11. The combination of a rigid annular felly, a rigid annular rim surounding the felly and movable relatively thereto and having an annular groove formed in one side thereof, an annular elastic member having an annular rib formed on one side thereof and seated in said groove, means for securing the other side of said member to said rim, means for securing said member to said felly, an expansible and contractible ring clamping said rib within said groove and having a split therein providing adjacent end portions, a block located between said end portions and adapted to abut against the same, and means for holding said block in place.

12. The combination of a rigid annular felly, a rigid annular rim surrounding the felly and movable relatively thereto and having an annular groove formed in one side thereof, an annular elastic member having an annular rib formed on one side thereof and seated in said groove, means for securing the other side of said member to said rim, means for securing said member to said felly, an expansible and contractible ring, clamping said rib within said groove and having a split therein providing adjacent end portions, a block located between said end portions and adapted to abut against the same, and an expansible and contractible ring seated on the first named ring and extending over said block and holding them in place.

13. The combination of a rigid annular felly, a rigid annular rim surrounding the felly and movable relatively thereto, said rim being substantially U-shaped in cross section, providing an annular channel therein, a ring surrounding the felly between it and the rim and having an outside diameter greater than the smallest diameter of the rim, said ring being capable of being sprung into said channel, an annular elastic member surrounded by said ring, means between said felly and said ring for clamping said member to said ring, means for securing said clamping means to said felly, and means for securing a part of said elastic member to said rim.

14. The combination of a rigid annular felly, a rigid annular rim surrounding the felly and movable relatively thereto, said rim being substantially U-shaped in cross section, providing an annular channel therein, a ring surrounding the felly between it and the rim and having an outside diameter greater than the smallest diameter of the rim, said ring being capable of being sprung into said channel, an expansible and contractible ring surrounding the felly between it and the first named ring, an annular elastic member having a part located between said rings, the second named ring being expanded and clamping said member between said rings, means for holding the second named ring in expanded condition, and means for securing the second named ring to the felly, and means for securing a part of said elastic member to said rim.

In testimony whereof I affix my signature in presence of two witnesses.

HOWARD F. SPELSHOUSE.

Witnesses:
A. V. GROUPE,
S. I. HARPER.